United States Patent
Knoell et al.

(10) Patent No.: US 12,181,027 B2
(45) Date of Patent: Dec. 31, 2024

(54) ELECTROMECHANICAL LINEAR ACTUATOR

(71) Applicant: Robert Bosch GmbH, Stuttgart (DE)

(72) Inventors: Reiner Knoell, Burgsinn (DE); Marco Knoell, Burgsinn (DE); Michael Goldbach, Lohr A. Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/462,095

(22) Filed: Sep. 6, 2023

(65) Prior Publication Data

US 2024/0117865 A1    Apr. 11, 2024

(30) Foreign Application Priority Data

Oct. 6, 2022   (DE) .................. 10 2022 210 556.7

(51) Int. Cl.
  *F16H 25/24*   (2006.01)
  *H02K 7/00*    (2006.01)
  *H02K 7/08*    (2006.01)
  *F16H 25/20*   (2006.01)

(52) U.S. Cl.
  CPC ......... *F16H 25/2454* (2013.01); *H02K 7/003* (2013.01); *H02K 7/083* (2013.01); *F16H 2025/2031* (2013.01); *F16H 2025/2078* (2013.01)

(58) Field of Classification Search
  CPC .............. F16H 2025/2078; F16H 25/2454
  USPC ....................................................... 74/89.39
  See application file for complete search history.

(56) References Cited

U.S. PATENT DOCUMENTS

| | | | |
|---|---|---|---|
| 6,453,761 B1* | 9/2002 | Babinski | H02K 7/06 310/80 |
| 9,077,215 B2* | 7/2015 | Kagawa | H02K 7/1025 |
| 2012/0160043 A1* | 6/2012 | Drumm | H02K 7/06 74/89.23 |
| 2016/0377099 A1* | 12/2016 | Stauder | B60T 13/746 92/136 |

FOREIGN PATENT DOCUMENTS

| | | |
|---|---|---|
| DE | 2 034 555 A1 | 1/1972 |
| DE | 24 03 633 A1 | 7/1975 |
| DE | 43 00 512 A1 | 7/1994 |
| DE | 199 48 265 C2 | 5/2001 |
| DE | 10 2012 214 552 A1 | 3/2013 |
| DE | 10 2013 215 842 A1 | 3/2015 |
| DE | 10 2016 107 390 A1 | 10/2017 |
| EP | 2 584 222 B1 | 4/2013 |

* cited by examiner

*Primary Examiner* — Randell J Krug
(74) *Attorney, Agent, or Firm* — Maginot, Moore & Beck LLP

(57) ABSTRACT

An electromechanical linear actuator having a threaded drive, which comprises a threaded nut connected to a cantilever tube and a lead screw connected to a hollow shaft of an electric motor via a rotationally fixed connection in such a way that, by a rotation of the hollow shaft and the lead screw, the threaded nut and the cantilever tube are linearly movable. An axial design length of the electromechanical linear actuator in the maximally retracted state is minimized in that a holding brake for the lead screw and a first rotary bearing for bearing the lead screw on a housing of the linear actuator are arranged within the hollow shaft.

9 Claims, 3 Drawing Sheets

ELECTROMECHANICAL LINEAR ACTUATOR

This application claims priority under 35 U.S.C. § 119 to application no. DE 10 2022 210 556.7, filed on 6 Oct. 2022 in Germany, the disclosure of which is incorporated herein by reference in its entirety.

The present disclosure relates to an electromechanical linear actuator according to the disclosure, in particular an electromechanical linear actuator having a threaded drive, which comprises a threaded nut connected to a cantilever tube and a lead screw connected to a hollow shaft of an electric motor via a rotationally fixed connection in such a way that, by a rotation of the hollow shaft and the lead screw, the threaded nut and the cantilever tube are linearly movable.

BACKGROUND

Electromechanical linear actuators of the aforementioned style comprise a housing from which the cantilever tube projects. In a maximally retracted state of the linear actuator, there is a shortest possible axial length of the linear actuator and, in a maximally extended state of the linear actuator, there is a maximum possible axial length of the linear actuator.

Publication DE 199 48 265 C2 discloses an electromechanical linear actuator whose electric motor is configured as a hollow shaft motor. Adjacent the electric motor, when viewed in the axial direction, the threaded nut is fixed to the hollow shaft thereof. Thus, the threaded nut rotates together with the hollow shaft while the lead screw is only moved linearly and does not rotate. The disadvantage of such electromechanical linear actuators is that, due to the adjacent arrangement of the electric motor and threaded nut when viewed in the axial direction, the axial design space requirement of the stationary housing of the linear actuator is large.

Publication DE 43 00 512 B4 discloses two exemplary embodiments of an electromechanical linear actuator used as a fuel pump. In both exemplary embodiments, a ball screw is used. In the second exemplary embodiment, the motor shaft of the electric motor made from a solid material is formed integrally with the lead screw, which forms the ball screw with a resting sleeve serving as a threaded nut. The lead screw thus rotates and is moved linearly. By way of deviation, in the first exemplary embodiment of DE 43 00 512 B4, an electric motor with a hollow shaft is provided, which simultaneously forms the rotating threaded nut of the screw drive. The lead screw is thus only moved linearly and does not rotate. Because the electric motor is arranged on the outer circumference of the threaded nut, the ratio between the retracted state and the extended state of the linear actuator is generally maximized compared to that of the second exemplary embodiment and that of DE 199 48 265 C2.

Patent EP 2 584 222 B1 discloses the part of an electric cylinder that is configured for coupling to a separate, non-integrated electric motor. The lead screw rotates but is not moved linearly. Instead, a cantilever tube is moved linearly. Compared to the aforementioned linear actuators, the linear actuator with the cantilever tube has the advantage that the mechanically and technically complex lead screw is received within the cantilever tube and is thus protected against dirt and mechanical damage.

DE 10 2013 215 842 A1 discloses a threaded drive or screw drive, which is realized, for example, in an electric cylinder. A housing of the threaded drive has comparatively thick circumferential wall portions and comparatively thin circumferential wall portions arranged therebetween in order to improve the stability of the housing. However, the connection of the threaded drive to a motor is not shown in DE 10 2013 215 842 A1.

SUMMARY

The problem addressed by the present disclosure is to provide an electromechanical linear actuator that reduces or eliminates the problems of the prior art. In particular, an axial design length of the electromechanical linear actuator in the maximally retracted state is to be minimized.

This problem is achieved by an electromechanical linear actuator according to the disclosure.

Further advantageous embodiments are the subject-matter of the disclosure.

Specifically, the problem is solved in that a holding brake for the lead screw and a first rotary bearing for bearing the lead screw on a housing of the linear actuator are arranged within the hollow shaft.

In this way, a particularly compact arrangement of the holding brake, the first rotary bearing, and the hollow shaft with respect to one another is achieved. In particular, these components can be arranged on a particularly short axial design length. In particular, an axial design length of the electromechanical linear actuator in the maximally retracted state is thus minimized. It could also be said that the design length of the electric motor is not considered in the design length of the linear actuator. The arrangement of the holding brake and the first rotary bearing within the hollow shaft means that the holding brake and the first rotary bearing are at least partially, preferably completely, facing an inner circumference of the hollow shaft with their outer circumference. It could also be said that the holding brake and the first rotary bearing are at least partially, preferably completely, arranged between two opposed front faces of the hollow shaft. The hollow shaft is preferably part of a rotor of the electric motor and thus comprises permanent magnets or coils on its outer circumference. The housing of the linear actuator is preferably also designed as the housing of the electric motor, and thus comprises coils or permanent magnets on its inner circumference. The electric motor can be designed in a variety of ways. The threaded drive can be a threaded rolling screw drive or a ball-threaded ball drive or a planetary (rolling) threaded drive. In the maximally retracted state, the cantilever tube can be at least largely, preferably substantially, received in the housing, wherein the cantilever tube is preferably guided in the housing by means of a sliding bearing.

Furthermore, the housing preferably comprises a first hollow beam, which projects into the hollow shaft of the electric motor and whose inner circumference serves to receive the first rotary bearing arranged on the outer circumference of the lead screw.

The first hollow beam is also configured so as to be fixed in relation to the lead screw and the threaded nut during operation. By means of the first hollow beam, it is thus enabled that the first rotary bearing can be arranged within the hollow shaft and the lead screw can nevertheless be borne on the housing.

A second rotary bearing is advantageously arranged between the outer circumference of a second hollow beam of the housing projecting into the hollow shaft of the electric motor and the inner circumference of the hollow shaft in an end region of the electric motor facing away from the cantilever tube.

The second hollow beam is also configured so as to be fixed in relation to the lead screw and the threaded nut during operation. By means of the second hollow beam, it is thus enabled that the second rotary bearing can be arranged within the hollow shaft and the hollow shaft can nevertheless be borne on the housing. This further contributes to the shortening of the axial design length, because, when the second rotary bearing is arranged on the outer circumference of the hollow shaft, it would have to be lengthened accordingly.

In a further embodiment of the electromechanical linear actuator, a screw support preferably configured as a piston is arranged on the lead screw in an end region of the lead screw facing away from the rotationally fixed connection, via which the lead screw is rotatably borne in the cantilever tube and via which the cantilever tube is also guided linearly along the end region of the lead screw.

By means of the screw support, preferably the piston, a support that is uniform over its circumference is achievable, and furthermore this piston could be designed to be fluid-tight so that a space forming between the lead screw and the cantilever tube is sealed, which leads to the facilitation of a lubrication, in particular of a contact region between the threaded nut and the lead screw.

Preferably, the first rotary bearing comprises two tapered roller bearings or spherical roller bearings in an O-assembly.

Thus, the first pivot bearing can be easily configured as a fixed bearing. If the rotationally fixed connection is also mechanically fixed, i.e., if the hollow shaft and the lead screw are attached to one another, this first rotary bearing simply serves to also bear the hollow shaft in terms of the apparatus technology.

In a further advantageous embodiment of the electromechanical linear actuator, the second rotary bearing comprises a radial groove ball bearing.

Advantageously, the second rotary bearing is configured as a floating bearing, so that, for example, a heat-induced relative movement between the hollow shaft and the second hollow beam in the longitudinal direction of the hollow shaft is enabled.

In combination with the first rotary bearing configured as a fixed bearing and the screw support, a certain bearing of the lead screw results overall.

Further preferably, a rotary encoder, which is arranged on a front face of the lead screw facing away from the cantilever tube, is arranged within the hollow shaft.

A position determination of the cantilever tube without a distance measuring system is thus possible.

In a further advantageous embodiment, a transmission arranged between the hollow shaft and the lead screw, preferably a planetary transmission, is arranged within the hollow shaft.

By means of such a transmission, a gear ratio between the hollow shaft and the lead screw that is sensible for the envisioned operation of the linear actuator can be adjusted, such that, for example in case of relatively low torques available from the electric motor, a relatively high torque can be generated on the lead screw, or vice versa.

Advantageously, the transmission is arranged in the longitudinal direction of the lead screw between the holding brake and the first rotary bearing.

In this way, any bending loads on the transmission can be reduced.

In a preferred embodiment of the electromechanical linear actuator, the holding brake is configured as a mechanical brake.

By means of such a mechanical brake, the necessary braking forces can be simply generated.

In particular, the electric motor and the threaded drive (lead screw and threaded nut) and the cantilever tube and the two rotary bearings are preferably arranged coaxially. It is furthermore advantageous when further components, e.g., the rotationally fixed connection and/or the screw support and/or the sliding bearing arranged between cantilever tube and housing and/or the holding brake, are coaxial. Imbalances or torques for the receiving and bearing are thus avoided.

In summary, such an electromechanical linear actuator is suitable for a variety of applications, such as for the movement of parts of an excavator arm or telescopic handler.

BRIEF DESCRIPTION OF THE DRAWINGS

Preferred embodiments are shown in further detail below with reference to the accompanying figures.

DETAILED DESCRIPTION

Figure 1:
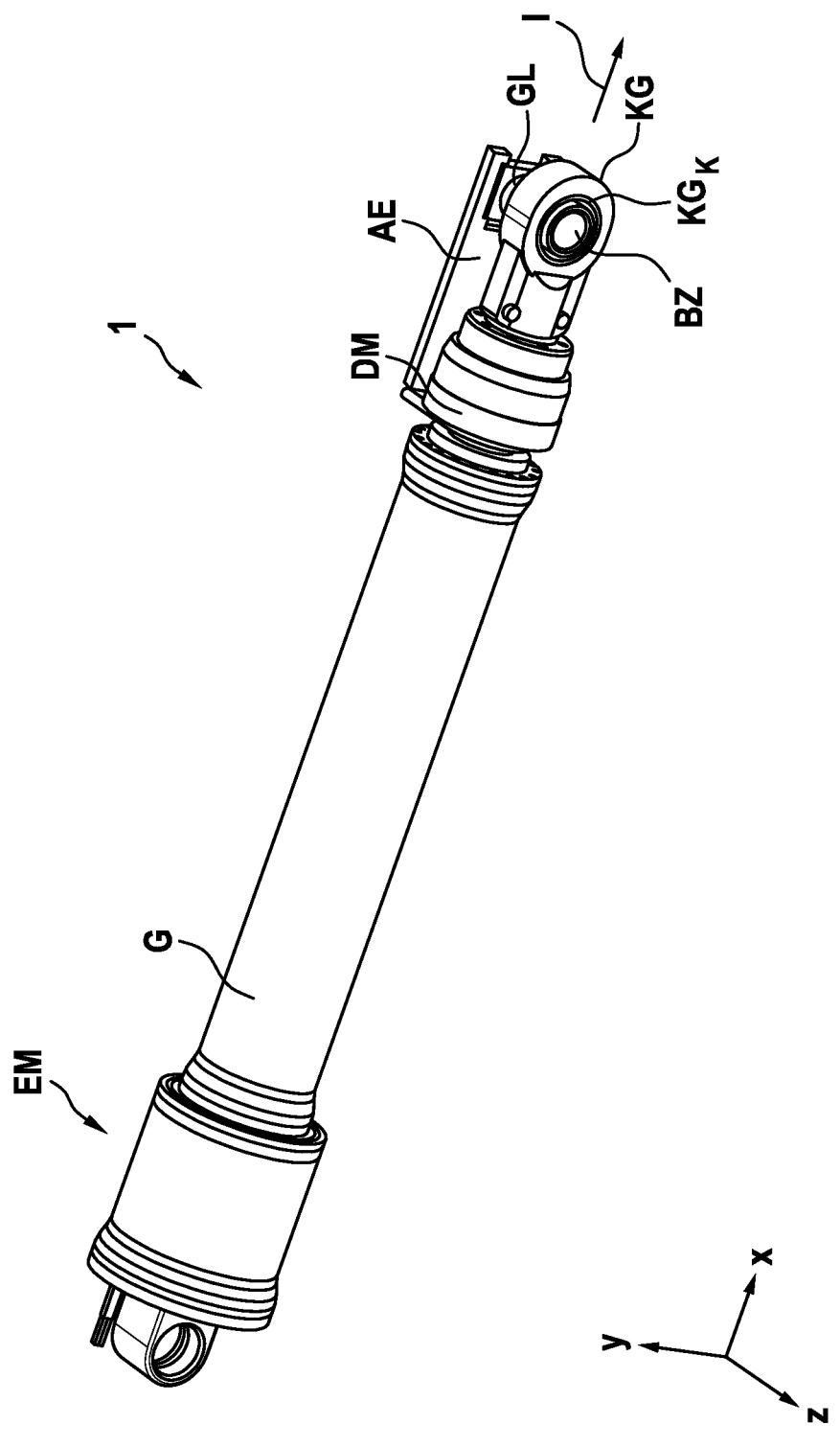
FIG. 1 schematically shows an electromechanical linear actuator according to a preferred embodiment of the disclosure in a three-dimensional view.
Figure 2:
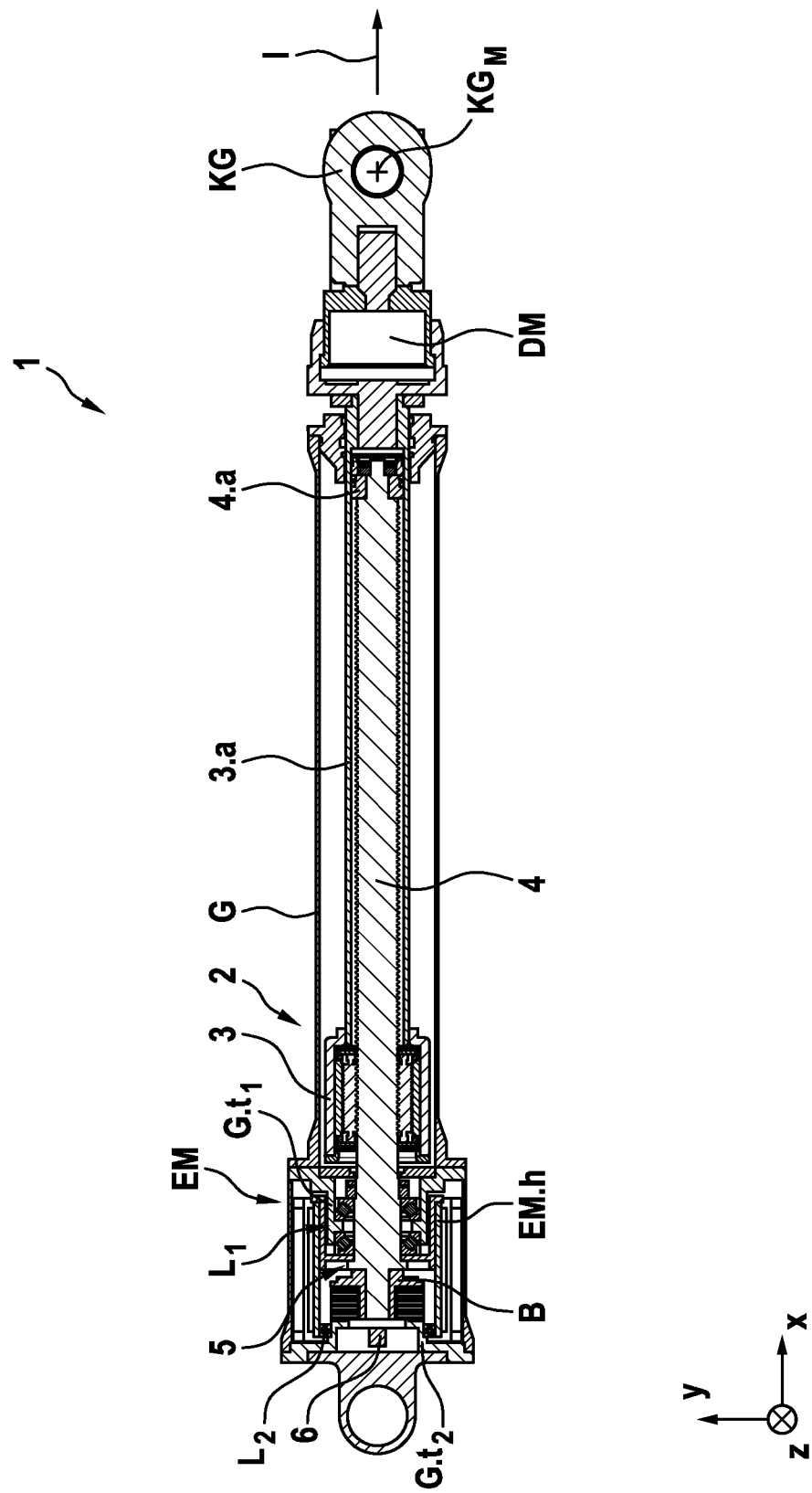
FIG. 2 shows a schematic cross-sectional view of the electromechanical linear actuator of FIG. 1.

FIG. 1 shows the exemplary embodiment of the electromechanical linear actuator 1, which can also be referred to as an electric cylinder, in a perspective three-dimensional view. FIG. 2 shows a schematic representation of the electromechanical linear actuator 1 according to FIG. 1 in a cross-sectional view, which runs through a longitudinal axis of the electromechanical linear actuator 1 and in an XY plane. The electromechanical linear actuator 1 has, among other things, a threaded drive 2, which comprises a threaded nut 3 connected to a cantilever tube 3a and a lead screw 4 connected to a hollow shaft EM.h of an electric motor EM via a rotationally fixed connection 5 in such a way that, by a rotation of the hollow shaft EM.h and the lead screw 4, the threaded nut 3 and the cantilever tube 3.a are linearly movable.

A holding brake B for the lead screw 4 and a first rotary bearing $L_1$ for bearing the lead screw 4 on a housing G of the linear actuator 1 are arranged within the hollow shaft EM.h.

The housing G comprises a first hollow beam $G.t_1$, which projects into the hollow shaft EM.h of the electric motor EM and whose inner circumference serves to receive the first rotary bearing $L_1$ arranged on the outer circumference of the lead screw 4.

Figure 3:
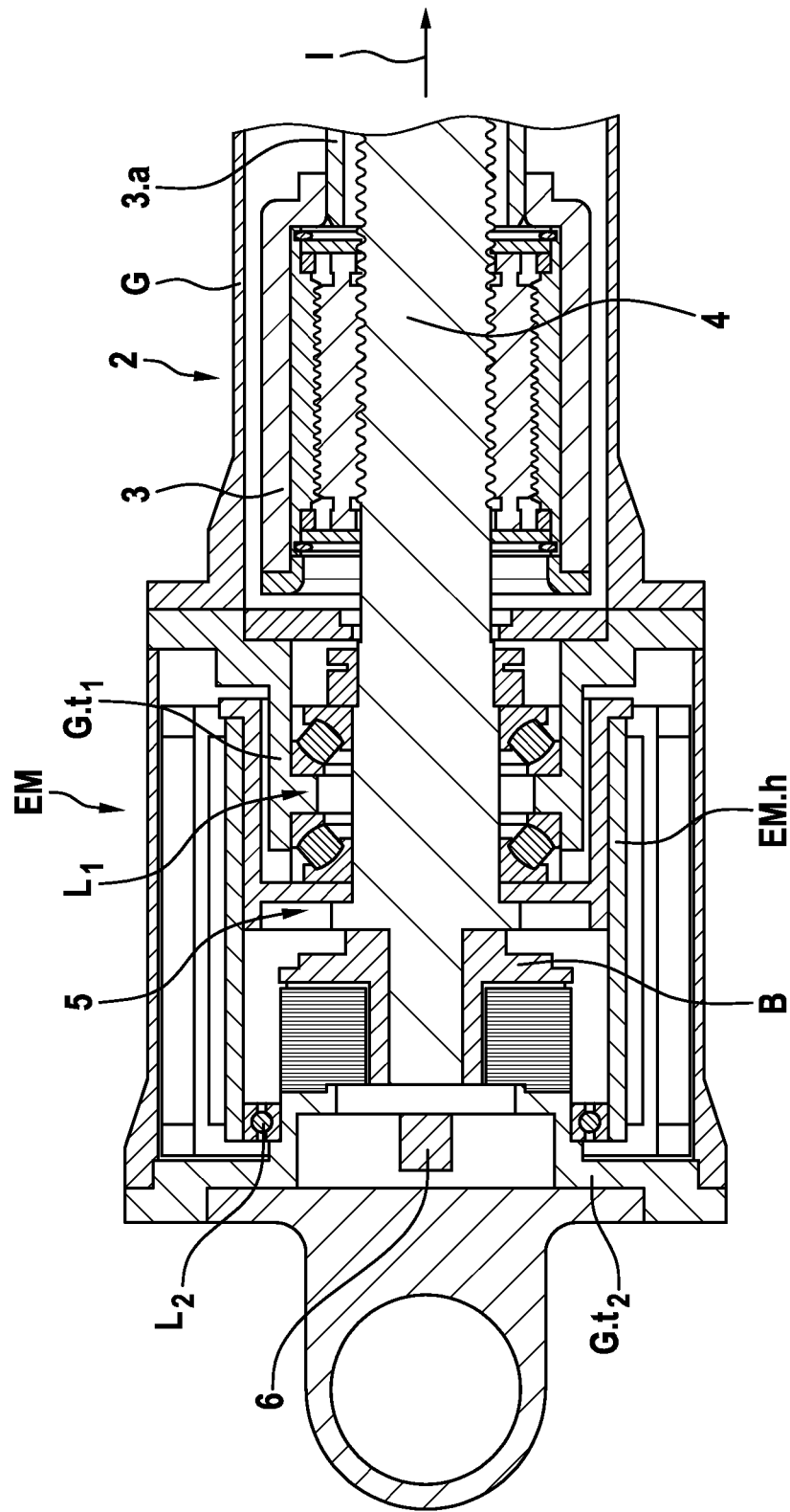
FIG. 3 shows an enlarged cut-out of the sectional view of the electromechanical linear actuator of FIG. 2.

The electric motor EM and the adjacent components are also shown in particular in the enlarged cut-out shown in FIG. 3.

The cantilever tube 3.a, whose rotation is prevented, is fixedly connected to a ball joint KG and can be extended out of the housing G. A first end of the linear actuator 1 is formed by means of this ball joint KG. In a maximally extended state, the linear actuator 1 has its maximum length, which is in particular measured between a joint center $KG_M$ of the ball joint KG and a joint center of a further joint arranged on the side of the linear actuator 1 opposite the ball joint KG and fixedly connected to the housing, said further joint being not further described herein. In a maximally retracted state, the linear actuator 1 has its minimum length. In the maximally retracted state, the cantilever tube 3.a barely protrudes from the housing G, or not at all. The cantilever tube 3.a is borne in the end region of the housing G facing the ball joint KG by means of a sliding bearing (not described in further detail) in the housing G. During the retraction or extension of the cantilever tube 3.a, the lead screw 4 rotates. It is not moved linearly in the longitudinal direction 1.

A length in the maximally retracted state is minimized in that the holding brake B and the first rotary bearing $L_1$ are arranged within the hollow shaft EM.h.

A second rotary bearing $L_2$ is arranged between the outer circumference of a second hollow beam $G.t_2$ of the housing G projecting into the hollow shaft EM.h of the electric motor EM and the inner circumference of the hollow shaft EM.h in an end region of the electric motor EM facing away from the cantilever tube 3a.

The second rotary bearing $L_2$ is thus arranged in the end region of the electric motor EM facing the further joint fixedly connected to the housing.

A screw support 4.a preferably configured as a piston is arranged on the lead screw 4 in an end region of the lead screw 4 facing away from the rotationally fixed connection 5, via which the lead screw 4 is rotatably borne in the cantilever tube 3a and via which the cantilever tube 3a is also guided linearly along the end region of the lead screw 4.

Thus, on the one hand, the rotation of the lead screw 4 in the cantilever tube 3a and, on the other hand, the linear movement (work stroke) of the cantilever tube 3a opposite (the end region of) the lead screw 4 is enabled. The screw support 4.a can thus also be referred to as a sliding pin bearing.

The first rotary bearing $L_1$ preferably comprises two tapered roller bearings or spherical roller bearings in an O-assembly.

The second rotary bearing $L_2$ comprises a radial groove ball bearing.

The second rotary bearing $L_2$ is configured as a floating bearing, so that, for example, a heat-induced relative movement between the hollow shaft EM.h and the second hollow beam $G.t_2$ in the longitudinal direction 1 of the hollow shaft EM.h is enabled.

An electric motor EM configured as a hollow shaft motor and a threaded drive 2 configured as a planetary (rolling) threaded drive are arranged in the housing G. More specifically, when viewed radially from the outside to the inside, the parts are assembled as follows: first the windings of the electric motor EM, then the hollow shaft EM.h of the electric motor EM, then a sleeve-like main body of the threaded nut 3, then roller-shaped planets of the threaded nut 3, and finally the lead screw 4 completely inside. A radial distance is provided between the hollow shaft EM.h and the main body of the threaded nut 3. By contrast, embodiments of the threaded nut 3 without such planets are contemplated.

The threaded nut 3, in particular its main body, is fixedly connected to an end portion of the cantilever tube 3a. The assembly consisting of the threaded nut 3 and the cantilever tube 3a and the ball joint KG is only linearly movable, which is in particular also enabled by means of a support element AE, which comprises a sliding stone GL movably borne in the longitudinal direction 1 for receiving a bolt BZ to be passed through a joint head $KG_K$ of the ball joint KG, so that the cantilever tube 3a can be supported on the bolt BZ with respect to a rotation about the longitudinal axis of the lead screw 4.

Furthermore, a dampening element DM for dampening axial impacts is preferably arranged between the ball joint KG and the end of the cantilever tube 3a facing away from the housing G. The end of the cantilever tube 3a facing away from the housing G is fixedly connected to the support element AE passing by the dampening element DM or comprises this support element AE.

The hollow shaft EM.h is connected to the lead screw 4 in a central region by means of the rotationally fixed connection 5. For example, a hollow shaft-side positive locking element and a screw-side positive locking element of the rotationally fixed connection 5 are configured and attached to one another in such a way that the hollow shaft EM.h and the rotationally fixed connection 5 and the lead screw 4 form a non-bending, rotatable assembly.

Due to the rigid design, the bearing of the rotating assembly consisting of lead screw 4, the rotationally fixed connection 5, and the hollow shaft EM.h can only be carried out with two bearing points, namely the first rotary bearing $L_1$ and the second rotary bearing $L_2$.

A rotary encoder 6, which is arranged on a front face of the lead screw (4) facing away from the cantilever tube 3a, is arranged within the hollow shaft EM.h.

The rotary encoder 6 is preferably configured as an absolute rotary encoder. A position determination of the cantilever tube 3a is thus possible without a distance measuring system.

It is contemplated that, between the hollow shaft EM.h and the lead screw 4, a transmission, preferably a planetary transmission, is arranged within the hollow shaft EM.h.

The transmission is interposed in the rotationally fixed connection 5 in such a way that a torque transfer between the hollow shaft EM.h and the lead screw 4 is ensured, but also with the transformation or reduction ratio generated by the transmission.

The transmission could be arranged in the longitudinal direction 1 of the lead screw 4 between the holding brake B and the first rotary bearing $L_1$.

The holding brake B is configured as a mechanical brake. By means of a brake actuator, a part of the holding brake B associated with the lead screw 4 and a part of the holding brake B associated with the housing G can be pressed against one another.

With the holding brake B, the lead screw 4 and thus also the electric motor EM can be fixed opposite the housing G.

LIST OF REFERENCE NUMERALS

1. Electromechanical linear actuator
2. Threaded drive
3. Threaded nut
3.a Cantilever tube
4. Lead screw
4.a Screw support
5. Rotationally fixed connection
6. Rotary encoder
EM Electric motor
EM.h Hollow shaft
B Holding brake
$L_1$ First rotary bearing
$L_2$ Second rotary bearing
G Housing
$G.t_1$ First hollow beam
$G.t_2$ Second hollow beam
KG Ball joint
$KG_M$ Joint center
$KG_K$ Joint head
AE Support element
GL Slide stone BZ Bolt
l Longitudinal direction

What is claimed is:

1. An electromechanical linear actuator, comprising:
a threaded drive which comprises a threaded nut connected to a cantilever tube and a lead screw connected to a hollow shaft of an electric motor via a rotationally fixed connection, such that the threaded nut and the cantilever tube are linearly movable by a rotation of the hollow shaft and the lead screw, wherein
a holding brake for the lead screw and a first rotary bearing for bearing the lead screw on a housing of the linear actuator are arranged within the hollow shaft.

2. The electromechanical linear actuator according to claim 1, wherein the housing comprises a first hollow beam which projects into the hollow shaft of the electric motor and whose inner circumference serves to receive the first rotary bearing arranged on an outer circumference of the lead screw.

3. The electromechanical linear actuator according claim 1, wherein a screw support configured as a piston is arranged on the lead screw in an end region of the lead screw facing away from the rotationally fixed connection via which the lead screw is rotatably borne in the cantilever tube and via which the cantilever tube is also guided linearly along the end region of the lead screw.

4. The electromechanical linear actuator according to claim 1, wherein the first rotary bearing comprises two tapered roller bearings or spherical roller bearings in an O-arrangement.

5. The electromechanical linear actuator according to claim 1, wherein a rotary encoder arranged on a front face of the lead screw facing away from the cantilever tube is arranged within the hollow shaft.

6. The electromechanical linear actuator according to claim 1, wherein the holding brake is configured as a mechanical brake.

7. The electromechanical linear actuator according to claim 1, wherein a second rotary bearing is arranged between an outer circumference of a second hollow beam of the housing projecting into the hollow shaft of the electric motor and the inner circumference of the hollow shaft in an end region of the electric motor facing away from the cantilever tube.

8. The electromechanical linear actuator according claim 7, wherein the second rotary bearing comprises a radial groove ball bearing.

9. The electromechanical linear actuator according to claim 7, wherein the second rotary bearing is configured as a floating bearing, such that a heat-induced relative movement between the hollow shaft and the second hollow beam in the longitudinal direction of the hollow shaft is enabled.

* * * * *